US012335737B2

(12) United States Patent
Loytynoja

(10) Patent No.: US 12,335,737 B2
(45) Date of Patent: Jun. 17, 2025

(54) SYSTEM AND METHOD FOR PRESENTING DIFFERENT GATT DATABASES BASED ON EATT BEARER

(71) Applicant: Silicon Laboratories Inc., Austin, TX (US)

(72) Inventor: Mikko Loytynoja, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 306 days.

(21) Appl. No.: 18/076,841

(22) Filed: Dec. 7, 2022

(65) Prior Publication Data

US 2024/0196219 A1 Jun. 13, 2024

(51) Int. Cl.
*H04W 12/30* (2021.01)
*G06F 16/242* (2019.01)
*H04W 76/10* (2018.01)

(52) U.S. Cl.
CPC ........ *H04W 12/35* (2021.01); *G06F 16/2445* (2019.01); *H04W 76/10* (2018.02)

(58) Field of Classification Search
CPC .... H04W 76/10; H04W 12/35; G06F 16/2445
See application file for complete search history.

(56) References Cited

U.S. PATENT DOCUMENTS

| 6,769,009 | B1 * | 7/2004 | Reisman | G06Q 20/108 |
| | | | | 709/200 |
| 8,381,191 | B2 * | 2/2013 | Mondal | G06F 8/70 |
| | | | | 713/177 |
| 10,547,995 | B2 * | 1/2020 | Lim | H04L 61/5069 |
| 10,966,073 | B2 * | 3/2021 | Petersen | H04W 4/70 |
| 11,564,074 | B2 * | 1/2023 | Kumar | H04L 12/4633 |
| 2018/0184479 | A1 * | 6/2018 | Motto | H04W 12/06 |
| 2019/0159000 | A1 * | 5/2019 | Ilami | G06Q 30/0251 |
| 2019/0253243 | A1 * | 8/2019 | Zimmerman | H04W 4/80 |

(Continued)

FOREIGN PATENT DOCUMENTS

| CA | 2539047 | C | * | 1/2012 | ............... G06F 8/35 |
| CN | 114268934 | A | * | 4/2022 | |
| JP | 2021519667 | A | * | 8/2021 | |

(Continued)

OTHER PUBLICATIONS

Bluetooth Core Specification, Version 5.4, Part F & G; pp. 1398-1539. Jan. 31, 2023.

*Primary Examiner* — Dangelino N Gortayo
(74) *Attorney, Agent, or Firm* — Nields, Lemack & Frame, LLC

(57) ABSTRACT

A system and method for presenting different GATT databases or different views of a GATT database based on the EATT bearer identity is disclosed. The GATT server identifies the EATT bearer being used and associates an application with that EATT bearer identity. The GATT server then creates an association between the application and a customized view of the GATT database that is presented to that application. In this way, a GATT client, with several applications resident thereon, may create a plurality of different connections to the GATT server, each with a unique EATT bearer identity. Each of these applications may have its unique customized view of the GATT database, based on that EATT bearer identity.

19 Claims, 2 Drawing Sheets

(56) References Cited

U.S. PATENT DOCUMENTS

2022/0038769 A1* 2/2022 Meiyappan .......... H04N 21/439
2023/0345560 A1* 10/2023 Kindo .................. H04W 76/14

FOREIGN PATENT DOCUMENTS

| JP | 2023160667 A * 11/2023 | .............. H04W 4/80 |
| KR | 20230097674 A * 7/2023 | |
| WO | WO-2016039598 A1 * 3/2016 | ......... H04L 63/0272 |

* cited by examiner

SYSTEM AND METHOD FOR PRESENTING DIFFERENT GATT DATABASES BASED ON EATT BEARER

FIELD

This disclosure describes a system and method for presenting different GATT databases based on the EATT bearer.

BACKGROUND

GATT (Generic Attribute profile) describes the client-server model used in Bluetooth LE (BLE) to communicate between devices. The GATT defines the interactions between the client and server as well as the GATT database structure which is used to exchange the data between the GATT server and client. The GATT database includes attributes. The most important types of attributes are services, characteristics and descriptors.

A service is a collection of data and associated behaviors to accomplish a particular function or feature and it may contain included services, mandatory characteristics, and optional characteristics. There are two types of services: primary service and secondary service. Primary services can be discovered by a client using a Primary Service Discovery procedure. Secondary services can be included in other services.

A characteristic is a value used in a service along with properties and configuration information about how the value is accessed and information about how the value is displayed or represented. This is the entity used mainly to transfer data between client and server. A characteristic has some properties which define permissions regarding how the client can interact with the characteristic as well as optional descriptors.

As an example, BLE defines Battery as a Service, where one of the characteristics is the battery level.

Each attribute has a handle that can be used to refer to that particular attribute as well as universally unique identifier (UUID) which is used to identify the type of the attribute.

The GATT database may be accessed using ATT (Attribute protocol). ATT defines a set of packets that are used to find, read, write, notify, and indicate attributes. The packets may be one of the following types: a command, a request, a response, a notification, an indication, or a confirmation. A command is a first packet where the client sends a command packet to the server requesting some action, where there is no response from the server. Requests are similar to commands in that they are transmitted by the client, however, a response from the server always follows a request. Notifications and indications are used by the server to push information to the client. Notification do not require a response from the client. However, indications need to be acknowledged by the client. This is done through the use of a Confirmation packet.

When a GATT client wants to access a GATT server, the process usually begins by querying the GATT database contents. This commences with a primary service discovery, which returns the handles of all primary services in GATT database. This can then be followed by querying the characteristics contained in each service and optionally reading the values of each characteristic that supports read operations. Alternatively, the GATT client can directly query a certain attribute, such as a characteristic, using the UUID to find its handle. The GATT client can then communicate with the GATT server by reading and writing the characteristic values.

Communications between a GATT client and a GATT server are controlled by ATT. All ATT requests are sent over an ATT bearer. An ATT bearer is channel used to send Attribute protocol packets. Each ATT bearer uses an L2CAP (Logical Link Control and Adaptation Protocol) channel.

Originally BLE permitted only a single ATT bearer using a fixed L2CAP channel. This is now also referred to as unenhanced ATT (ATT).

BLE was modified to support multiple ATT bearers established between two devices. Each ATT bearer uses a separate L2CAP channel and can have a different configuration. These bearers are referred to as Enhanced ATT bearers, or EATT. In BLE, there is a single ATT bearer that uses a fixed L2CAP channel that is available as soon as the ACL (Asynchronous Connection-oriented Logical transport) connection is established. This may occur when two devices have been connected over BLE. Additional ATT bearers can be established using L2CAP. Each EATT bearer uses L2CAP with Enhanced Credit Based Flow Control Mode. These channels can be opened and closed at any time during the BLE connection.

However, currently, if there are multiple applications that are accessing the same GATT server, the GATT database shown to each application is the same. This was originally because only one ATT bearer was permitted. However, even with the addition of multiple EATT bearers, the same database is still made accessible to each application. However, there are scenarios wherein a GATT server may have multiple databases, and different applications require access to these different databases. Alternatively, there may be scenarios where an application should not have access to all of the GATT database.

Therefore, it would be beneficial if there was a system and method to allow different applications on one GATT client to access different databases, or different views of a database, on a GATT server.

SUMMARY

A system and method for presenting different GATT databases or different views of a GATT database based on the EATT bearer identity are disclosed. The GATT server identifies the EATT bearer being used and associates an application with that EATT bearer identity. The GATT server then creates an association between the application and a customized view of the GATT database that is presented to that application. In this way, a GATT client, with several applications resident thereon, may create a plurality of different connections to the GATT server, each with a unique EATT bearer identity. Each of these applications may have its unique customized view of the GATT database, based on that EATT bearer identity.

According to one embodiment, a method of customizing a GATT database disposed on a GATT server, based on an application accessing the GATT server, is disclosed. The method comprises creating a connection between a GATT client and the GATT server, wherein the application is disposed on the GATT client; using the GATT server to select a EATT bearer associated with the connection; using the EATT bearer to allow the application to access the GATT server; and presenting a customized view of the GATT database to the application based on an identity of the EATT bearer. In some embodiments, the GATT server initially presents an initial service to the application, wherein the application identifies itself, and the GATT server associates the EATT bearer and the application based on information provided to the initial service. In certain embodiments, the GATT server determines the customized view of the GATT database based on an identity of the application. In certain embodiments, the initial service presents a list of possible applications, wherein each of the possible applications has a predetermined customized view of the GATT database associated with that possible application. In some further embodiments, the GATT server presents the customized view of the GATT database after the application selects one of the possible applications. In some embodiments, the GATT server determines the customized view of the GATT database to present based on authentication information from the application. In some embodiments, the GATT server comprises a plurality of databases and the customized view comprises one of the plurality of databases. In some embodiments, the customized view comprises a subset of contents contained within the GATT database.

According to another embodiment, a system for presenting a customized view of a GATT database to an application executing on a GATT client is disclosed. The system comprises a GATT client, having the application executing thereon, the GATT client having a processing unit, a Bluetooth network interface and a memory device that contains instructions; and a GATT server, having the GATT database stored therein, the GATT server having a processing unit, a Bluetooth network interface and a memory device that contains instructions; wherein the GATT client establishes a connection with the GATT server, and wherein the instructions in the GATT server enable the GATT server to: select a EATT bearer associated with the connection between the GATT server and the GATT client; use the EATT bearer to allow the application to access the GATT server; and present a customized view of the GATT database to the application based on an identity of the EATT bearer. In some embodiments, the GATT server initially presents an initial service to the application, wherein the application identifies itself, and the GATT server associates the EATT bearer and the application based on information provided to the initial service. In certain embodiments, the GATT server determines the customized view of the GATT database based on an identity of the application. In some embodiments, the initial service presents a list of possible applications, wherein each of the possible applications has a predetermined customized view of the GATT database associated with that possible application. In some embodiments, the GATT server presents the customized view of the GATT database after the application selects one of the possible applications from the list. In some embodiments, the GATT server determines the customized view of the GATT database to present based on authentication information from the application. In some embodiments, the GATT server comprises a plurality of databases and the customized view comprises one of the plurality of databases. In some embodiments, the customized view comprises a subset of contents contained within the GATT database.

According to another embodiment, a GATT server for presenting a customized view of a GATT database to an application disposed on a GATT client is disclosed. The GATT server comprises a processing unit; a Bluetooth network interface; and a memory device that contains the GATT database and instructions, wherein the instructions in the GATT server enable the GATT server to: select a EATT bearer associated with a connection between the GATT server and the GATT client; use the EATT bearer to allow the application to access the GATT server; and present a customized view of the GATT database to the application based on an identity of the EATT bearer. In some embodiments, the GATT server initially presents an initial service to the application, wherein the application identifies itself, and the GATT server associates the EATT bearer and the application based on information provided to the initial service. In certain embodiments, the initial service presents a list of possible applications, wherein each of the possible applications has a predetermined customized view of the GATT database associated with that possible application and the GATT server presents the customized view of the GATT database after the application selects one of the possible applications from the list.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
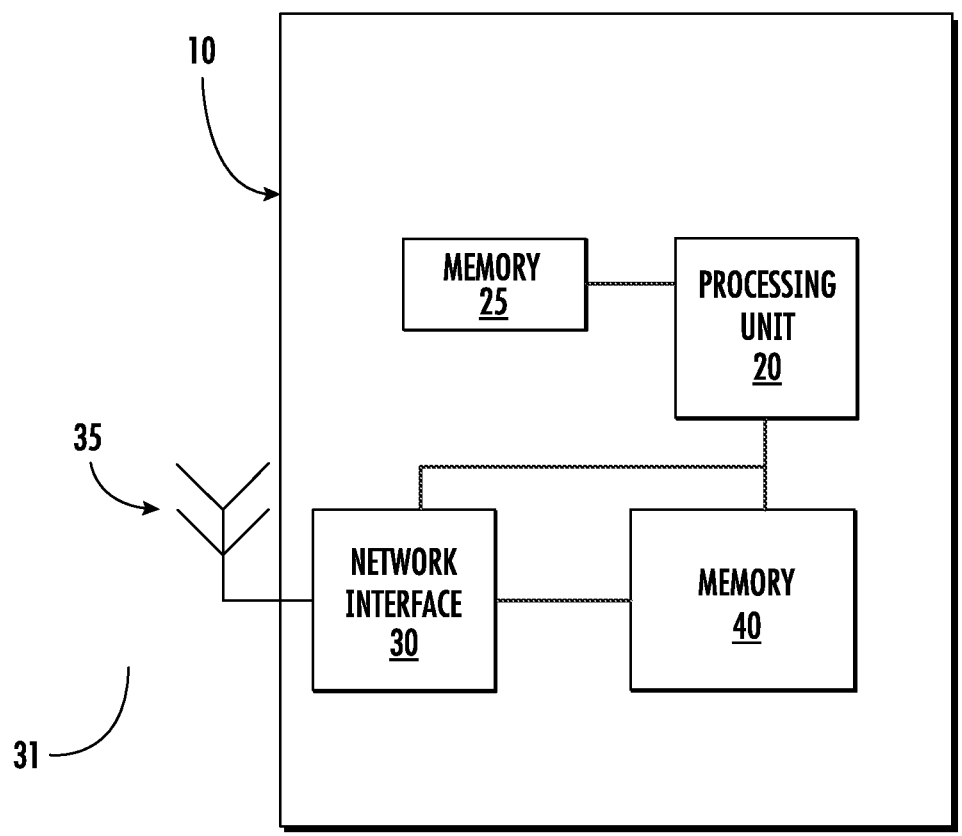
FIG. 1 shows a block diagram of a Bluetooth device according to one embodiment.

FIG. 1 shows a block diagram of a representative Bluetooth device 10 that may be used to allow different applications to utilize different GATT databases or different views of the GATT database based on the EATT bearer.

The Bluetooth device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the Bluetooth device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the Bluetooth device 10. The instructions contained on this second computer readable non-transitory media may be downloaded onto the memory device 25 to allow execution of the instructions by the Bluetooth device 10.

The Bluetooth device 10 also includes a Bluetooth network interface 30 that connects with a Bluetooth network 31 using an antenna 35.

The Bluetooth device 10 may include a second memory device 40 in which data that is received and transmitted by the Bluetooth network interface 30 is stored. This second memory device 40 is traditionally a volatile memory. The processing unit 20 has the ability to read and write the second memory device 40 so as to communicate with the other devices in the Bluetooth network 31.

Although not shown, the Bluetooth device 10 also has a power supply, which may be a battery or a connection to a permanent power source, such as a wall outlet.

While the processing unit 20, the memory device 25, the Bluetooth network interface 30 and the second memory device 40 are shown in FIG. 1 as separate components, it is understood that some or all of these components may be integrated into a single electronic component. Rather, FIG. 1 is used to illustrate the functionality of the Bluetooth device 10, not its physical configuration.

Figure 2:
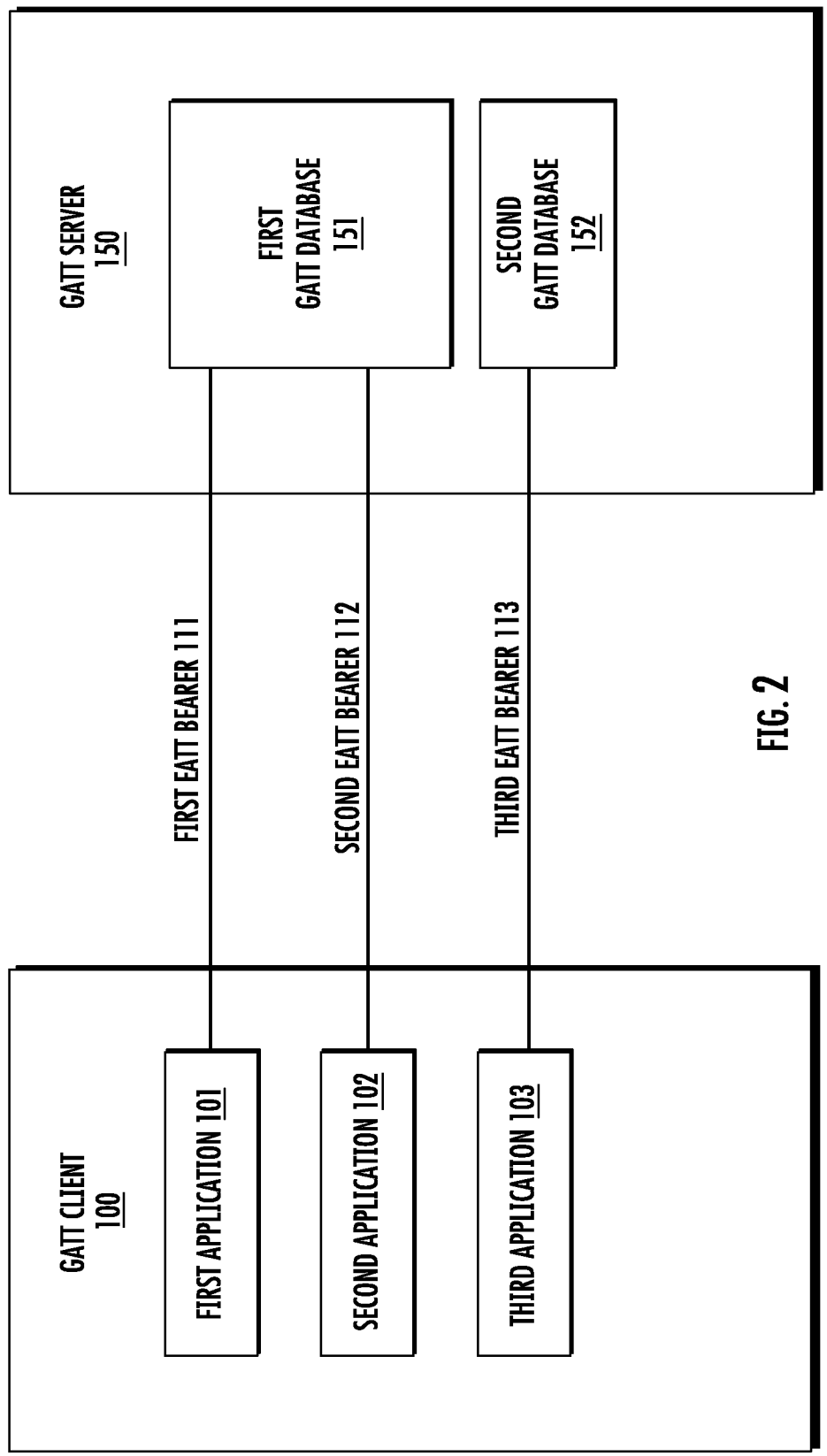
FIG. 2 shows a network with a GATT server and a GATT client according to one embodiment.

FIG. 2 shows a configuration of two Bluetooth devices. One is configured as a GATT client 100 while the second is configured as a GATT Server 150. The GATT client 100 may have the architecture described above. The GATT server 150 may have at least the components described above, however, the memory device may have a much larger capacity than a typical Bluetooth device. Additionally, the computational ability of the GATT server 150 may be much greater than a typical Bluetooth device.

Note that the GATT client 100 has a plurality of applications, first application 101, second application 102 and third application 103. Additionally, note that the GATT server 150 has two databases; first GATT database 151 and second GATT database 152. Note that in some embodiments, these two databases may actually be contained within a single larger database. In this case, the first GATT database 151 represents a first view of the larger GATT database, where only a first portion of the contents are presented. Similarly, in this case, the second GATT database 152 represents a second view of the larger database where only a second portion of the contents are presented.

Note that three applications do not need to access the same information within the GATT database within the GATT server 150. The third application 103 wishes to access the second GATT database 152, while the other applications wish to access the first GATT database 151.

The following describes a procedure by which this configuration can be achieved.

First, the GATT client 100 forms a Bluetooth connection with the GATT server 150, using conventional techniques.

The GATT client 100 then opens a first L2CAP channel. The GATT server 150 assigns a L2CAP identifier when it creates the first EATT bearer 111. This usually happens dynamically such that the GATT server 150 simply selects the first free identifier. Thus, the identifier selected by the GATT server is specific to the first EATT bearer 111, but not to a particular application at the GATT client 100.

Thus, there needs to be a procedure to associate the first application 101 with the first EATT bearer 111. There are a number of ways that this could be achieved.

For example, the identification of the application could be performed by utilizing dynamic GATT, where the services presented by the GATT Server 150 may change based on different parameters. When the first EATT bearer 111 is created, the GATT Server 150 presents a view of the database that only includes an initial service, which may be a "GATT DB connection service". This service is populated by the GATT client 100 to inform the GATT server 150 which application is using the first EATT bearer 111 when the first EATT bearer 111 is first opened. After this, the GATT database can be dynamically updated to show the application specific GATT database, which in this example is first GATT database 151.

For example, in certain embodiments, there is a predetermined list of possible applications that the GATT server 150 offers to the GATT client 100. Each of these possible applications has a predefined view of the GATT database (such as the first GATT database 151 or the second GATT database 152) associated with it. The selection of one of these applications by the GATT client 100 defines the view provided to that application.

In another embodiment, the GATT server 150 may require some authentication information from the GATT client 100. Based on the level of authentication, the GATT database provided to the application may be determined.

At this point, any requests or commands that are delivered over the first EATT bearer 111 will be directed to the first GATT database 151.

Note that additional applications present on the GATT client 100 may follow a similar procedure. For example, the second application 102 may open a second L2CAP channel to the GATT server 150. As before, the GATT server 150 will assign this second L2CAP channel a new identifier when the second EATT bearer 112 is created. The GATT server 150 may then present a view of the database that only includes a "GATT DB connection service". This service is populated by the GATT client 100 with a value that represents the second application 102. The GATT Server 150 then presents a view of the GATT database that corresponds with the second application 102, which in this example is also the first GATT database 151.

For example, the third application 103 may open a third L2CAP channel to the GATT server 150. As before, the GATT server 150 will assign this third L2CAP channel a new identifier when the third EATT bearer 113 is created. The GATT server 150 may then again present a view of the database that only includes a "GATT DB connection service". This service is populated by the GATT client 100 with a value that represents the third application 103. The GATT Server 150 then presents a view of the GATT database that corresponds with the third application 103, which in this example is the second GATT database 152.

At the completion of this procedure, the configuration is as shown in FIG. 2. Thus, the process allows the GATT server 150 to present a customized view of the GATT database to each application, based on the EATT bearer identity.

The use of this initial service is akin to TCP/IP ports, in which a connection is done to a first port to open the connection, but often communications are then conducted using a second port. The initial services described herein may be analogous to the first port, while the customized view is similar to the second port.

Of course, there are other ways of associating an application with a EATT bearer and may be used with the methods described herein.

While the above descriptions the use of multiple databases, the present disclosure has other uses. In another embodiment, the application is still associated with the EATT bearer as described above, however the same database is used for all EATT bearers. In this embodiment, the different EATT bearers may cause the GATT server 150 to modify how data is transferred. For example, a different data stream may be provided for each application writing to the same GATT characteristic. In one specific example, there may be a logging service to which multiple applications may send messages. The GATT server may store the messages in application specific files, based on the EATT bearer from which the message was received. This technique can be more generally applied such that data is uniquely processed by the GATT server based on the EATT bearer. For example, a unique file may be opened for each EATT bearer.

The present system and method has many advantages. Currently, the dynamic GATT database may be used to customize the services offered to the GATT client so that only relevant services are available. This customization may be performed, for example, by first providing some provisioning service, such as the GATT Database connection service, described above, which configures the device to access certain services. However, each application on that GATT client has access to the same services.

Using the techniques described above, this customization may be further extended to individual applications running on the GATT client, so that each application only accesses the relevant services.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of customizing a GATT (Generic Attribute profile) database disposed on a GATT server, based on an application accessing the GATT server, comprising:
   creating a connection between a GATT client and the GATT server, wherein a first application and a second application are disposed on the GATT client;
   opening a first L2CAP (Logical Link Control and Adaptation Protocol) channel for the first application;
   using the GATT server to select a first EATT (Enhanced Attribute protocol) bearer associated with the first L2CAP channel;
   using the first EATT bearer to allow the first application to access the GATT server;
   opening a second L2CAP channel for the second application;
   using the GATT server to select a second EATT bearer associated with the second L2CAP channel; and
   presenting a customized view of the GATT database to the first application based on an identity of the first EATT bearer, such that a different customized view of the GATT database is presented to the second application based on an identity of the second EATT bearer.

2. The method of claim 1, wherein the GATT server initially presents an initial service to the first application, wherein the first application identifies itself, and the GATT server associates the first EATT bearer the first application based on information provided to the initial service.

3. The method of claim 2, wherein the GATT server determines the customized view of the GATT database based on an identity of the first application.

4. The method of claim 2, wherein the initial service presents a list of possible applications, wherein each of the possible applications has a predetermined customized view of the GATT database associated with that possible application.

5. The method of claim 4, wherein the GATT server presents the customized view of the GATT database after the first application selects one of the possible applications.

6. The method of claim 1, wherein the GATT server determines the customized view of the GATT database to present based on authentication information from the first application.

7. The method of claim 1, wherein the GATT server comprises a plurality of databases and the customized view comprises one of the plurality of databases.

8. The method of claim 1, wherein the customized view comprises a subset of contents contained within the GATT database.

9. A system for presenting a customized view of a GATT (Generic Attribute profile) database to applications executing on a GATT client, comprising:
   a GATT client, having a first application and a second application executing thereon, the GATT client having a processing unit, a Bluetooth network interface and a memory device; and
   a GATT server, having the GATT database stored therein, the GATT server having a processing unit, a Bluetooth network interface and a memory device that contains instructions;
   wherein the GATT client establishes a connection with the GATT server, and wherein the instructions in the GATT server enable the GATT server to:
   select a first EATT (Enhanced Attribute protocol) bearer associated with a first L2CAP (Logical Link Control and Adaptation Protocol) channel opened by the first application to the GATT server;
   select a second EATT bearer associated with a second L2CAP channel opened by the second application to the GATT server;
   use the first EATT bearer to allow the first application to access the GATT server; and
   present a customized view of the GATT database to the first application based on an identity of the first EATT bearer, such that a different customized view of the GATT database is presented to the second application based on an identity of the second EATT bearer.

10. The system of claim 9, wherein the GATT server initially presents an initial service to the first application, wherein the application identifies itself, and the GATT server associates the first EATT bearer and the first application based on information provided to the initial service.

11. The system of claim 10, wherein the GATT server determines the customized view of the GATT database based on an identity of the first application.

12. The system of claim 10, wherein the initial service presents a list of possible applications, wherein each of the possible applications has a predetermined customized view of the GATT database associated with that possible application.

13. The system of claim 12, wherein the GATT server presents the customized view of the GATT database after the first application selects one of the possible applications from the list.

14. The system of claim 9, wherein the GATT server determines the customized view of the GATT database to present based on authentication information from the first application.

15. The system of claim 9, wherein the GATT server comprises a plurality of databases and the customized view comprises one of the plurality of databases.

16. The system of claim 9, wherein the customized view comprises a subset of contents contained within the GATT database.

17. A GATT (Generic Attribute profile) server for presenting a customized view of a GATT database to a plurality of applications disposed on a GATT client, comprising:
- a processing unit;
- a Bluetooth network interface; and
- a memory device that contains the GATT database and instructions, wherein the instructions in the GATT server enable the GATT server to:
  - select a first EATT (Enhanced Attribute protocol) bearer associated with a first L2CAP (Logical Link Control and Adaptation Protocol) channel opened by a first application on the GATT client to the GATT server;
  - select a second EATT bearer associated with a second L2CAP channel opened by a second application on the GATT client to the GATT server;
  - use the first EATT bearer to allow the first application to access the GATT server; and
  - present a customized view of the GATT database to the first application based on an identity of the first EATT bearer, such that a different customized view of the GATT database is presented to the second application based on an identity of the second EATT bearer.

18. The GATT server of claim 17, wherein the GATT server initially presents an initial service to the first application, wherein the first application identifies itself, and the GATT server associates the first EATT bearer and the first application based on information provided to the initial service.

19. The GATT server of claim 18, wherein the initial service presents a list of possible applications, wherein each of the possible applications has a predetermined customized view of the GATT database associated with that possible application and the GATT server presents the customized view of the GATT database after the first application selects one of the possible applications from the list.

* * * * *